Figure 1:
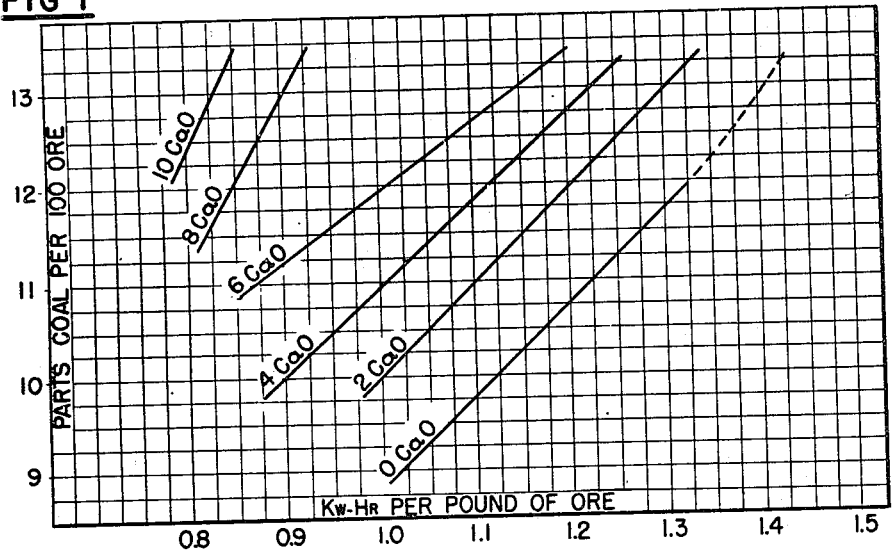

INVENTORS
WILLIS M. PEIRCE,
ROBERT K. WARING AND LUTHER D. FETTEROLF
BY Pennie, Edmonds, Morton, Barrows
ATTORNEYS

UNITED STATES PATENT OFFICE 2,476,453

TITANIFEROUS MATERIAL FOR PRODUCING TITANIUM DIOXIDE

Willis M. Peirce, Lehighton, and Robert K. Waring and Luther D. Fetterolf, Palmerton, Pa., assignors, by mesne assignments, to Quebec Iron and Titanium Corporation, New York, N. Y., a corporation of Delaware Application August 19, 1947, Serial No. 769,470

4 Claims. (Cl. 75—30)

This invention relates to titaniferous material for producing titanium dioxide, and more particularly to titanium slag concentrates suitable for chemical processing to produce pigment titanium dioxide. The principal object of the invention is the provision, as a new article of commerce, of a titanium slag concentrate of good quality for the production of titanium dioxide pigment by the sulfuric acid digestion process, and with a titanium-iron ratio so high that ferrous sulfate need not be removed by crystallization in the course of the pigment production process.

There exist in several parts of the world large deposits of ores composed largely of the oxides of titanium and iron, with titanium present in in too low a percentage for economic processing for the recovery of pigment titanium dioxide ($TiO_2$). Numerous efforts have been made to recover either the iron or the titanium from such ores, with indifferent and economically unsuccessful results. The treatment of such ores by conventional smelting methods to produce marketable pig iron has failed because of the adverse effect of the titanium on the behavior of the slag produced. Very little serious consideration has heretofore been given to the possibility of treating these ores with the primary object of recovering the titanium rather than accepting its presence as a necessary evil.

In the endeavor to produce a titanium slag concentrate by the smelting of titanium-iron ores, we have found that the slag produced by conventional smelting practices is unsuitable for acid digestion and leaching to produce a leach solution from which titanium hydrate (hydrated titanium dioxide) can be economically recovered by hydrolysis. It has heretofore been commonly supposed that substantial quantities of fluxes, such for example as lime, soda and alumina, must be used in smelting titanium-iron ores in order to obtain slags of sufficient fluidity to permit good separation of the metallic iron and slag and free-tapping of the slag from the furnace. Where it is desired to recover the titanium, the use of such substantial quantities of fluxes is objectionable because the fluxes dilute and lower the titanium content of the slag and render it uneconomical for pigment production. In an exhaustive investigation of the subject, we have determined the specifications of the titanium slag concentrate required for subsequent satisfactory and economical processing for the production of titanium dioxide pigment by the conventional acid and equivalent processes. We have also found that titanium-iron ores can be smelted under properly controlled conditions of charge composition with relatively little and even no added flux to produce a titanium slag concentrate meeting these specifications and at the same time producing a metallic iron product which can be marketed as pig iron.

The present invention contemplates the provision of a titanium slag concentrate possessing the characteristics which we have found to be required for subsequent satisfactory and economical chemical processing. One characteristic of the slag is its high titanium grade, containing at least 60% (and preferably at least 70%) titanium calculated as $TiO_2$. Another characteristic of the slag is its good digesting properties under customary commercial conditions of acid digestion and leaching. Upon acid digestion and leaching of the slag, the recovery of titanium in the leach solution is at least 80% and preferably at least 85% with an acid-to-titanium dioxide ratio (usually referred to as the "acid-to-titanium ratio") in the leach solution of between 1.8 and 2.3. Additionally, the slag concentrate is characterized by a relatively high titanium to iron ratio as compared with the titaniferous concentrates heretofore customarily used in the production of pigment titanium dioxide by the conventional sulfuric acid digestion process. As a result, pigment may be produced directly from the leach solution obtained by sulfuric acid digestion of the slag concentrate without the necessity of removing part of the iron in the solution by crystallization in the form of copperas, as is the practice when using ilmenite ore concentrates. A further characteristic of the slag concentrate is that it is not highly reduced, although part of its titanium content may be present in the form of oxides lower than $TiO_2$, which lower oxides are herein collectively referred to as trivalent titanuim. The amount of iron in the slag is generally indicative of the amount of trivalent titanium in the slag, the lower the iron content the greater the trivalent titanium content. With an iron (Fe) content of 2 to 20% and preferably 4 to 15% (present in the slag as FeO), the slag generally contains a sufficiently low amount of trivalent titanium. The degree of reduction of the slag may be determined by heating it in air at a temperature of 800–1000° C. and determining the gain in weight due to the result reoxidation of the trivalent titanium. A slag showing a weight gain not exceeding 3.5% (and preferably not exceeding 2%) attributable to the oxidation of trivalent titanium is generally of satisfactory quality with respect to its trivalent titanium content. With a slag of the contemplated low trivalent titanium content, from 1 to 30%, and preferably not more than about 15%, of the titanium in the leach solution will be present in the form of trivalent titanium.

The principal raw material source of titanium for the manufacture of titanium dioxide pigment has heretofore been ilmenite ore, a ferrous titanate, containing roughly about equal parts of titanium dioxide and iron oxides with relatively small amounts of other oxides. In the chemical processing of ilmenite, or other suitable titaniferous material, for the production of titanium dioxide pigment, the titaniferous material is digested with acid, usually sulfuric acid, and the digested (e. g. sulfated) mass is leached with water to obtain a solution of the resulting water-soluble salts (e. g. titanium and iron sulfates). Present day commercial practice for the digestion of ilmenite involves an essentially autogenous method in which the heat of reaction between sulfuric acid and the ore is relied upon to maintain the elevated temperature required for complete reaction and to produce a readily leachable dry cake of titanium sulfate. The ore, ground so that approximately 90% passes a 325-mesh screen, is mixed with the required amount of sulfuric acid, usually of about 92–94% strength, in a suitable tank (a commercial digester may hold as much as 20 tons of ilmenite). The well-mixed ore and acid is then heated to a temperature in the range of 120–150° C., depending upon the particular ore being used, by introducing live steam into the bottom of the tank. Superficial reaction of ore and acid during the heating up period also supplies some heat. When the mass reaches the 120–150° C. temperature, a small amount of water is introduced into the tank so as to cause localized heating through dilution of the acid. Vigorous reaction of the entire mass takes place with the generation of sufficient heat to complete the reaction and evaporate essentially all of the associated water, so that a dry cake is produced in a matter of a few minutes. During the period of violent reaction, air is passed through the mass so that the resulting cake will be porous and therefore more amenable to leaching. The reacting mass may reach a temperature of 175–200° C., and during the several hours required for it to cool, additional baking takes place which aids in completing the reaction and improving the recovery. After the digested cake has cooled, leaching of the soluble titanium sulfate is carried out in the same tank.

In digesting and leaching the titanium ore, it is necessary not only to obtain a reasonable recovery of the titanium, but also to end up with a titanium sulfate solution having suitable properties for producing in subsequent processing a pigment grade titanium dioxide. Economic and technical considerations limit the amount of acid which should be used for digesting. If an excessive quantity of acid is required to obtain a reasonable recovery of titanium, the cost of producing the pigment is increased, because of the initial cost of the additional acid required per pound of titanium dioxide manufactured and the additional cost associated with the disposal of the greater quantity of waste acid. Furthermore, while a good recovery may be possible with a large excess of acid, the resulting solution is not suitable for pigment manufacture. The primary properties determining the suitability of the leach solution for pigment manufacture are (1) the concentration of titanium, (2) the acid-to-titanium ratio, and (3) its stability. A titanium concentration in the solution of about 200–250 grams of titanium dioxide per liter is preferred, and it is desirable to approach closely this range of concentration directly in the leaching step so as to reduce to a minimum the amount of evaporating that must be done to obtain the desired final titanium concentration. The ratio of the sulfuric acid content of the solution to its titanium dioxide content should fall within the range of 1.8 to 2.3. If the ratio falls below 1.8, unstable solutions are likely to result and premature hydrolysis may take place. The stability of the solution should be such as not to hydrolyze too readily, otherwise difficulty may be experienced in handling it up to the precipitation step. If the acid-to-titanium ratio exceeds 2.3, the rate of hydrolysis becomes too slow and complete precipitation of the titanium will not be readily realized, and the crude titanium hydrate formed will be coarse and aggregated and cannot be muffled to a pigment of the best quality.

In calculating and expressing the acid-to-titanium ratio, the acid is determined by titration with sodium hydroxide and methyl orange indicator. Thus, 25 ml. (milliliter) of 10% barium chloride solution is placed in a 400 ml. beaker, and 2 drops of methyl orange indicator is added. 1 ml. of the solution to be tested is washed into the barium chloride solution, and the volume is made up to 200 ml. with boiling water. Titration, with good agitation, is carried out to a peach colored end point with N/10 sodium hydroxide solution. By this method of titration, the sulfate ($SO_4$) combined as titanium sulfate and free sulfuric acid is determined, and expressed as grams of sulfuric acid ($H_2SO_4$) per liter of solution. The titanium is determined by analysis, and expressed as grams of $TiO_2$ per liter of solution. These "gram" determinations of sulfuric acid and titanium dioxide, per liter, give the acid-to-titanium ratio of the solution.

The titanium slag concentrate of the invention can be processed for the manufacture of pigment titanium dioxide in much the same manner that ilmenite is now processed. It is high grade, at least 60% and preferably at least 70% $TiO_2$. At least 80% and preferably at least 85% of its titanium content is recoverable by customary methods of digestion and leaching with an acid-to-titanium ratio in the leach solution of between 1.8 and 2.3. In evaluating the digestibility of a slag, we use the following procedure which closely simulates the conditions and results of the customary commercial practice. About 6.5 pounds of the ground slag and about 13 pounds of 93% sulfuric acid are mixed in a heated test pan (16 inches long, 10 inches wide, and 9 inches high, made of sheet iron). The pan is heated on a hot plate to initiate the reaction (in place of live steam) and to compensate for the large radiation losses that would otherwise permit the mass to cool in much less time than in commercial scale equipment. The exact amount and concentration of acid are variables that affect the recovery. The mixture is stirred by hand with an iron hoe, and 100 cc. of water is added when the mass has been heated to the desired temperature (125–175° C. depending on the type of charge, concentration of acid etc.). The stirring is continued during the violent reaction (which frequently starts without the addition of water) and until the mass has dried up (generally about 3 minutes). A cover is placed on the pan and it is allowed to sit on the hot plate at a temperature of around 160° C. for two hours. When the digested mass is cool, it is chipped out of the pan, leached with cold water, filtered and analyzed. Slags of the invention, when digested and leached by this procedure, give a recovery of at least 80% of the titanium content with an acid-to-titanium ratio of 1.8 to 2.3 in a leach solution containing, by direct leaching, about 200–250 grams per liter of titanium calculated as $TiO_2$. When slags of the invention are subjected to digestion and leaching in equipment of commercial size, the time required to secure equal or better recovery (conversion to titanium sulfate solution) is much less than that required for the treatment of ilmenite in the same equipment and under the same conditions; in some cases the time required being only about half that required to effect the same results with ilmenite.

When the titanium sulfate solution (prepared for hydrolysis) contains any iron sulfate (as is always the case in processing ilmenite and most other titaniferous materials), a trivalent titanium content of 0.5 to 1% (based on the titanium in solution) is desired, since under this condition all iron present in the solution will be in the ferrous state. It is necessary that all iron in the solution be kept in the ferrous state during hydrolysis and subsequent processing of the titanium hydrate because ferric iron is much more readily adsorbed by the hydrate than is ferrous iron, and if ferric iron is present a pigment of good quality cannot be obtained. If the trivalent titanium in the solution exceeds about 1% of the total solubilized titanium, the excess trivalent titanium should be oxidized before subsequent processing because of the adverse effect of the excess reduced titanium on pigment quality and to permit recovery of the titanium as titanium dioxide. Such excess trivalent titanium may be oxidized by aeration in the presence of a copper catalyst, or in any other appropriate manner.

The titanium slag concentrate of the invention is advantageously made by a method which involves smelting, preferably in an electric arc furnace, a charge mix made up of the titanium-iron ore, coal and flux (including such as is naturally present in the ore), the titanium, iron, coal and flux in the charge mix being correlated to produce, preferably with a smelting temperature between 1500 and 1700° C., a metallic iron product (e. g. pig iron) and the titanium slag concentrate. The required high titanium grade of the slag is attained by limiting the amount of flux, and particularly added lime, in the charge mix, the amount of added lime not exceeding 10 parts by weight (and preferably not exceeding 6 parts) per 100 parts of ore, and varying from that maximum amount down to none at all. Coal or equivalent carbonaceous reducing agent is required in the charge mix for the reduction of the iron oxide to metallic iron and for carburizing the iron, but contrary to conventional smelting practice an excess of coal is avoided. The amount of coal included in the charge mix is slightly less than that theoretically required to reduce the iron oxide in the ore (with oxidation of the carbon to carbon monoxide) and to carburize the iron. In general, this amount of coal will range from 8 to 14 parts by weight per 100 parts of ore. Coal is herein used generically to include coke and any other carbonaceous material suitable as a reducing agent in metallurgical smelting.

The ores which are particularly applicable to the production of the slag concentrate of the invention are those falling within the following compositional ranges:

| | Per cent |
|---|---|
| Titanium dioxide ($TiO_2$) | 30–50 |
| Iron (Fe) | 30–50 |
| Gangue | Up to 12 |

The gangue constituents in these ores are for the most part lime (CaO), magnesia (MgO), alumina ($Al_2O_3$) and silica ($SiO_2$). Whatever iron in the form of ferrous oxide (FeO) is allowed, under the controlled conditions of smelting, to go into the slag acts in the nature of a flux, and the slag is formed of such iron, the gangue constituents of the ore and the ash of the coal, practically all of the titanium dioxide in the ore, and such small amount of added flux as may be used. It is desirable, in the smelting practice, to hold extraneous additions to a minimum and to produce as high grade titanium slag concentrate as practicable.

For purposes of illustration, the invention will be particularly described in conjunction with the smelting of Coulombe ore of which the following is a typical analysis:

| | Per cent |
|---|---|
| Fe | 36.8 |
| $TiO_2$ | 39.5 |
| CaO | 0.5 |
| MgO | 4.0 |
| $Al_2O_3$ | 2.6 |
| $SiO_2$ | 2.7 |
| $P_2O_5$ | less than 0.02 |

Since slags of the invention contain at least 60% $TiO_2$, the remaining slag constituents amount to 40% or less. The gangue constituents of Coulombe ore account for about 20% of the remaining slag constituents, of which about 1% is CaO. The balance, i. e. 20% or less, of the slag is made up of ferrous oxide, or lime, or both. For reasons hereinafter explained the slag contains at least 2% iron (calculated as Fe but present in the slag as FeO). Depending mainly upon the composition of the charge, the slags may be high iron and low lime or high lime and low iron. Thus, slags containing 60% $TiO_2$ may contain from 15 to 4.6% Fe and from 1 to 15% CaO, and slags containing 70% $TiO_2$ may contain from 7.7 to 2% iron and 1 to 8.4% CaO (1% CaO being derived from the gangue) in the case of Coulombe ore. In the customary digesting and leaching practices, practically all of the slag, except its lime and silica contents are dissolved. Therefore, the more lime the slag contains the greater is the insoluble residue. In present day plants designed for treating ilmenite limited equipment for handling insoluble residues is provided, since the amount of such residues is small (say 1% of the solution). In such plants, the high iron and low lime slags of the invention are preferred. On the other hand, the disposal of ferrous sulfate is troublesome, and in plants provided with appropriate equipment for handling solid residues, the high lime and low iron slag may be preferred.

The amount of coal included in the charge mix is slightly less (generally about 10% less) than the theoretical amount required to reduce the iron oxide in the ore to metallic iron with oxidation of carbon to carbon monoxide and to carburize the metallic iron product, which may contain from 1 to 3% carbon. The actual weight of coal included in the charge mix will depend, of course, upon the grade of the coal, that is, its available carbon content. A high grade coal is desirable, since the ash content of the coal enters and hence dilutes the slag. Throughout this specification, where weights or parts of coal are specified, the coal is a high grade anthracite containing about 13% ash, analyzing 60% $SiO_2$, 30% $Al_2O_3$ and 10% FeO. In general, ores containing 30–35% iron require from 8 to 10 parts by weight by weight of coal per 100 parts of ore, and ores containing 35–45% iron require from 10 to 14 parts of coal per 100 parts of ore. With Coulombe ore about 11 parts of coal per 100 parts of ore generally give satisfactory results, and with ores of the Allard Lake type with higher iron (44.4% Fe) about 14 parts of coal per 100 parts of ore give good results. More coal can be initially tolerated in continuous operation than in batch operation until a surplus of coal builds up in the furnace, when the amount of coal in the charge mix is cut back to about the same as in batch operation.

The amount of lime included in the charge mix will depend upon the amount of iron oxide to be left in the slag and the amount and nature of the gangue constituents of the ore and the ash of the coal. The following calculated slag compositions are based on smelting Petit Pas ore, with 14 parts of coal and the indicated parts of lime (calculated as CaO but added to the charge mix in the form of limestone) per 100 parts of ore. The ore analysis is as follows:

| | Per cent |
|---|---|
| Fe | 42.2 |
| $TiO_2$ | 36.4 |
| CaO | 0.02 |
| MgO | 2.2 |
| $Al_2O_3$ | 2.0 |
| $SiO_2$ | 1.5 |
| $P_2O_5$ | 0.01 |
| Bal. | .68 |

Parts of CaO added to charge mix per 100 parts of ore

| Composition of resulting slag | Low iron slags | | | High iron slags | | |
|---|---|---|---|---|---|---|
| | 9.4 | 5.7 | 2.4 | 1.7 | 0.5 | 0.1 |
| | Per cent | Per cent | Per cent | Per cent | Per cent | Per cent |
| $TiO_2$ | 65.0 | 70.0 | 75.0 | 65.0 | 70.0 | 75.0 |
| FeO | 6.35 | 6.35 | 6.35 | 19.05 | 15.25 | 10.18 |
| CaO | 16.85 | 10.95 | 5.00 | 3.16 | 1.06 | .31 |
| MgO | 3.93 | 4.22 | 4.52 | 3.93 | 4.22 | 4.52 |
| $Al_2O_3$ | 4.55 | 4.88 | 5.23 | 4.55 | 4.88 | 5.23 |
| $SiO_2$ | 4.63 | 4.97 | 5.33 | 4.63 | 4.97 | 5.33 |
| $P_2O_5$ | | | | | | |
| Misc. oxides | .69 | .73 | .77 | .68 | .73 | .78 |
| | [1]102 | 102.1 | 102.2 | 101 | 101.11 | 101.35 |

[1] The excess over 100% is due to expression of lower valence titanium as $TiO_2$.

In the actual smelting of a calculated charge mixture, a slag may be obtained with a titanium content (expressed as $TiO_2$) considerably greater than the calculated percentage, because of the presence in the slag of lower oxides of titanium resulting from the reduction during smelting of some titanium dioxide. For example, the existence of considerable $Ti_2O_3$ in the slag may show 85% or more $TiO_2$ when the slag is analyzed and the titanium reported as $TiO_2$. Slags of such high trivalent titanium tenor are very refractory and cannot be readily melted in smelting. Several lower oxides of titanium may be present in the slag. $Ti_3O_5$ in the common run of slags and $Ti_2O_3$ in highly reduced slags have been identified by X-ray analysis, and other lower oxides, such as $Ti_4O_7$, TiO and possibly others, are known to exist and may be present in the slag. For convenience, all lower oxides of titanium are collectively referred to herein as trivalent titanium ($Ti_2O_3$) since any lower oxide or combination of lower oxides can be calculated to equivalent $Ti_2O_3$ on the basis of oxygen deficiency for $TiO_2$.

The object of the smelting operation is to produce pig iron and the titanium slag concentrate of the invention with high titanium content. The slag produced in smelting must be sufficiently fluid to flow readily from the furnace and separate cleanly from the iron. If the ore were pure iron and titanium oxides and all the iron were reduced, leaving a pure titanium dioxide slag, the slag would not have the necessary fluidity. Fluxes must therefore be present to produce a slag of the requisite fluidity. A slag made up of titanium dioxide, lime and ferrous oxide in suitable proportions to give the slag adequate fluidity would be rendered too viscous if a considerable part of the titanium dioxide were reduced to oxides of lower valence. Nevertheless, to produce pig iron in the operation, it is necessary to have a reducing agent present to reduce the ferrous oxide, and while ferrous oxide is more easily reduced than titanium dioxide, conditions can exist in a smelting furnace which will result in the reduction of some of the titanium dioxide. Such reduction may occur even though the amount of carbon present is less than enough to reduce all of the ferrous oxide. The conditions which favor the reaction of part of the carbon with titanium dioxide, even though it should theoretically be used up by the ferrous oxide present are (1) the existence in the furnace of a zone of high temperature, (2) the presence at local points of more than enough carbon to satisfy the ferrous oxide present at those points, and (3) the lack of subsequent opportunity for reoxidation of the reduced titanium oxides by unreduced ferrous oxide. Homogenizing currents in the slag tend to prevent the existence of the aforementioned conditions favorable to the reduction of titanium dioxide, but in a viscous slag such currents are negligible. The electric arc furnace, with its zones of very high temperature in the arcs, offers favorable conditions for the reduction of titanium dioxide.

A harmful reduction of titanium dioxide in the smelting operation is prevented by so proportioning the constituents of the charge mix that when the coal included in the charge has reduced as much ferrous oxide as it will, the resulting slag made up of oxides of titanium, gangue material, unreduced ferrous oxide and deliberately added lime will have the requisite fluidity at a temperature of 1500 to 1700° C. If the temperature at which the resulting slag would be sufficiently fluid (provided the titanium dioxide were not reduced to any large extent) exceeds 1700° C., then excessive reduction of titanium dioxide will occur and a still higher temperature will be necessary for slag fluidity, resulting in an excessive operating temperature or even rendering the operation impossible. On the other hand, slags which become fluid at a temperature much below 1500° C. tend to reach a completely molten state before the carbon has reduced as much ferrous oxide as intended, and these slags containing an excessive amount of ferrous oxide are very corrosive to the furnace refractories.

When the smelting operation is practiced in an electric arc furnace, it is necessary to carefully control the amount of coal in the charge so that by the time the charge has reached a completely molten state the desired amount of ferrous oxide will have been reduced. The amount of unreduced ferrous oxide left in the slag will be sufficient, in conjunction with the other slag-forming constituents included in the charge, to give a slag of proper fluidity at a temperature between 1500 and 1700° C. The charge should be introduced into the furnace in such a manner (e. g. by intermittent charging at the sides) as to bring it up to the melting temperature at a moderate rate, thus permitting reduction of a substantial part of the ferrous oxide before melting of the charge takes place. In the zones of the arcs the graphite electrodes furnish a continuous source of carbon and the temperature is adequate for reduction of titanium dioxide, and some reduction of titanium dioxide will take place. Hence the slag should be tapped from the furnace within a limited time after it is completely molten to avoid excessive reduction of the titanium dioxide.

The influence of lime on smelting behavior is pronounced and its use so changes the smelting conditions that slag characteristics are markedly different, depending upon the proportion of lime (CaO) to ore used in the charge. Smelting behavior and slag characteristics are also dependent upon the coal addition to the charge. Thus, 1 part of coal per 100 parts of ore neutralizes in many respects the effect of the addition of 2 parts of lime. The explanation will develop in the discussion of the smelting data hereinafter presented.

As a preliminary to the presentation of that data, a discussion of the chemical and mineralogical constitution of slags is desirable as well as an explanation of slag specifications as fixed by slag processing for the production of titanium dioxide pigment. The analyses of two types of slag produced from an ore (Allard Lake) of relatively low gangue content are given below. Slag A is a titanium slag concentrate of the invention resulting from a smelting charge to which 6.4 parts of lime (as limestone) were added per 100 parts of ore. Slag B is a slag resulting from a smelting operation of the same ore without lime addition and with more coal included in the charge, and is unsuitable for chemical processing to produce pigment titanium dioxide.

|  | Slag A | Slag B |
| --- | --- | --- |
|  | Per cent | Per cent |
| Ti expressed as $TiO_2$ | 70 | 86 |
| FeO | 7 | 2 |
| CaO | 13 | 1 |
| MgO | 5 | 5.5 |
| $Al_2O_3$ | 4.5 | 5 |
| $SiO_2$ | 3 | 3.5 |
| Miscellaneous oxides | 1.5 | 2 |
|  | 102.0 | 105.0 |
| Per cent weight gain on oxidation of slag sample | 2.0 | 5.0 |

The percentage weight gains of the slags result from oxidation upon short heat treatment in air at a temperature of 800 to 1000° C. Ferrous oxide (FeO) in the slag is converted to ferric oxide ($Fe_2O_3$) and accounts for a percentage weight gain equal to $\frac{1}{9}$ of the percent of FeO in the slag. The percentage weight gains attributable to oxidation of the FeO in slags A and B are therefore 0.8 and 0.2%, respectively. Weight gains of 1.2 and 4.8% are therefore attributable to oxidation of reduced or lower oxides of titanium in slags A and B, respectively. Calculations show that about 85% of the titanium in slag B is present as $Ti_2O_3$ or there is present a combination of lower oxides such that the oxygen deficiency for $TiO_2$ is about 4.8 parts per 100 parts of slag.

X-ray analyses show the presence of $CaO \cdot TiO_2$, and an isomorphous group of compounds of the type $RO \cdot 2TiO_2$, in which R may be Ti, Fe or Mg. After oxidation of the slag, X-ray analyses show the presence of $TiO_2$ (rutile) in amount corresponding to the estimated $TiO \cdot 2TiO_2$ present in the unoxidized slag and $MgO \cdot 2TiO_2$ in amount compatible with the MgO content of the slag.

The amount of trivalent titanium present in the slag has an important effect on slag quality. Highly reduced slag, such as slag B, is unsuitable for titanium pigment production by the acid digestion process. While satisfactory pigment can be produced from slags of this type, the leach recovery of $TiO_2$ is low and the trivalent titanium content of the leach solution is unduly high.

In acid digestion and leaching of the slag, oxidation of trivalent titanium takes place to some extent, being usually relatively greater the higher the trivalent titanium content of the slag. Slags giving a weight gain of 0.1 to 2% attributable to oxidation of trivalent titanium are generally preferred, although slags of good quality can be produced with such weight gains up to 3.5%. Slags giving leach solutions with 1 to 15% of the solubilized titanium in the form of trivalent titanium are preferred, but under practical conditions of commercial smelting in an electric arc furnace more highly reduced slags are often produced, giving leach solution with 20% and even as high as 30% of the solubilized titanium in the form of trivalent titanium. The excess of trivalent titanium in the leach solution may be oxidized in any appropriate manner.

Figure 2:
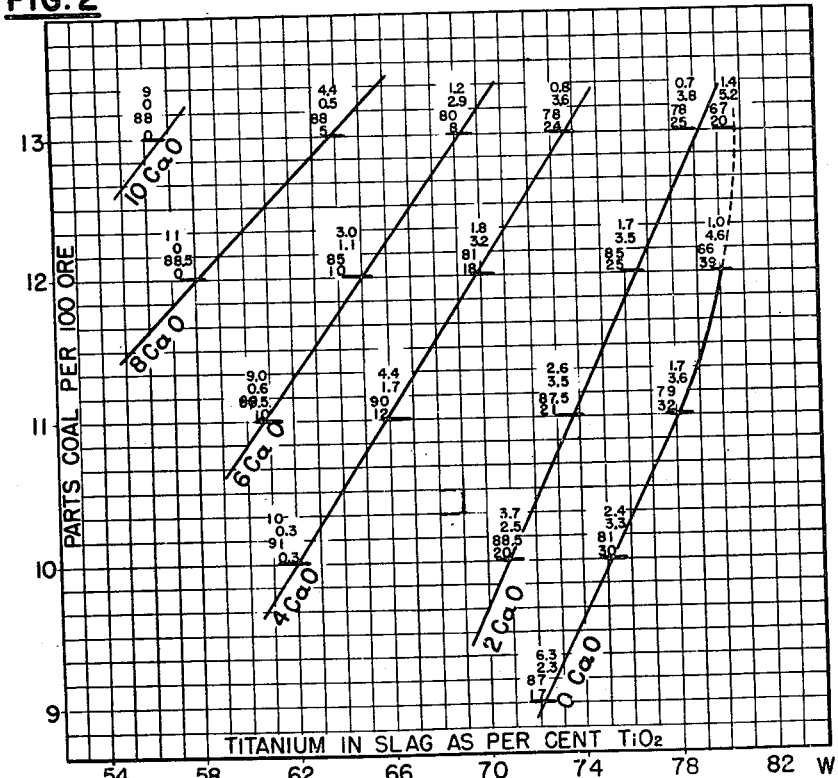

The correlation between smelting conditions, charge composition and slag composition required to produce titanium slag concentrates of the invention will be better understood from the following discussion of smelting data, and the accompanying drawing, in which the curves of Figs. 1 and 2 show the energy requirement and slag properties, respectively, plotted against charge composition.

Smelting was conducted as a batch operation in an electric arc furnace of 100 kw. capacity. Batches of 200 pounds of Coulombe titanium-iron ore, limestone and coal where charged to the hot furnace and smelted to the point at which the molten products tapped represented 100% recovery of the charge. Low energy input per pound of ore resulted in a deficient tap whereas excessive energy input resulted in tapping from the furnace not only the smelted charge but also the protective slag skull which is maintained on the side walls of the furnace. Selection of 100% tap recovery as an endpoint of smelting affords a convenient basis and serves better than any other to show the influence of charge composition on energy requirement, smelting behavior, slag characteristics, leaching recoveries, etc.

Fig. 1 of the drawing shows the energy requirement per pound of ore for charges varying in coal by increments of 1 part per 100 parts of ore and in lime by increments of 2 parts per 100 parts of ore. The relative displacements of the energy requirement curves for charges of different lime contents show the potent fluxing effect of lime. In quantitative terms, two parts of lime so flux the charge and subsequently fluidize the melt that 100% recovery of molten products is obtained with a decrease of 0.1 kilowatt-hour per pound of ore. The effect of variation in coal is even more pronounced. In general, a decrease in coal by one part in the region of theoretical coal requirement is accompanied by a decrease in energy of 0.1 kilowatt-hour per pound of ore. In terms of energy, the addition of two parts of lime is equivalent to the removal of one part of coal and vice versa.

In Fig. 2 of the drawing, companion curves show the relationship between charge composition and slag characteristics, the parts of coal and lime per 100 parts of ore being plotted against the titanium in the slag reported in percent $TiO_2$. Thus, the titanium grade of the slag is plotted against coal content of the charge mix for each of the several lime additions. The top figure, in the four figure columns, shows the percent of iron (present as ferrous oxide) in the slag, the 2nd figure shows the weight gain of the slag upon oxidation (corrected for $FeO \rightarrow Fe_2O_3$) and is indicative of the trivalent titanium in the slag, the 3rd figure shows the leaching recovery of titanium, and the bottom figure shows the percent of solubilized titanium present in the leach solution as trivalent titanium. The acid-to-titanium ratios of the leach solutions are given in the following table:

*Acid-titanium ratio of leach solution*

| Parts Coal | Parts CaO | | | | | |
|---|---|---|---|---|---|---|
| | 0 | 2 | 4 | 6 | 8 | 10 |
| 9 | 2.25 | | | | | |
| 10 | 2.26 | 2.29 | 2.33 | | | |
| 11 | 2.34 | 2.15 | 2.10 | 2.38 | | |
| 12 | 2.68 | 2.14 | 2.34 | 2.29 | 2.58 | |
| 13 | 2.52 | 2.22 | 2.28 | 2.39 | 2.31 | 2.55 |

The grade of the slag varies with lime addition, the titanium content of the slag decreasing as the lime addition is increased. Increasing the addition of coal produces a marked increase in the grade of the slag, although a decrease in slag grade might be expected in view of the dilution effect of the coal ash. Additional coal reduces more of the titanium to the trivalent form, and in the resulting more highly reduced slag the $TiO_2$ equivalent of the titanium in the slag is relatively and even abnormally high.

A consideration of Fig. 2 of the drawing shows that only within a restricted area are slags produced of that quality required for subsequent chemical processing, namely (1) reasonably high grade, (2) good leaching recovery, (3) low trivalent titanium in the leach solution and (4) satisfactory acid-to-titanium ratio. These qualities are fixed by the charge composition and the smelting conditions for any particular charge composition. By way of illustration, the smelting behavior of charge compositions at the borders of the compositional field will be discussed.

A 13 coal-0 lime mix is very refractory, and since a high temperature is required for melting, a large amount of iron reduction occurs before fusion. The fluxing effect of ferrous oxide is thereby lost and the melting difficulty correspondingly increased. The first pool of slag formed in the high temperature electrode zone is in a very pasty condition and, there being an excess of coal, reduction of titanium dioxide to lower oxides proceeds. The effect is very decidedly that of increasing slag viscosity, and a greatly increased temperature is required to fluidize the slag for tap. The higher temperature required for tap results in greater reduction of titanium dioxide. While these changes are occurring in the small slag pool, the surrounding charge is undergoing similar but delayed changes as the melting zone progresses toward the furnace walls. Even though a slag temperature of 1700° was exceeded, the smelt did not reach the endpoint desired. That is, the slag recovery was low. Continued smelting might have resulted in higher slag recovery, but trivalent titanium would have been increased and the grade of slag correspondingly increased to bring the 13 coal-0 lime point of Fig. 2 into line with the lower portion of the curve.

It is apparent from the slope of the 0 lime curve and the slag quality figures that smelting behavior and slag quality improve with decreasing coal. The desired slag recoveries were obtained from charges containing 11 parts coal or less. However, trivalent titanium continues high even with only 9 parts of coal which is a deficient amount for the chemical reactions occurring. The explanation is believed to lie in the inherent refractoriness of a 0 lime slag even though the slag may contain some FeO. Referring to the 9 coal-0 lime charge, the explanation of the anomalous existence of fairly high FeO and quite high reduced titanium in the slag is that once the coal is exhausted in the slag pool in the electrode zone, the graphite electrodes themselves supply carbon for reduction. The slag in the small pool undergoes high iron reduction and high titanium reduction and is of high viscosity. The slag later developed by the surrounding charge is higher in FeO and of lower trivalent titanium content because of the deficiency of coal and remoteness from the reducing action of the electrodes. A non-homogeneous slag then exists in the furnace and is so because of the high viscosity which prevents diffusion and convection currents which might equalize the slag composition. The final tapped slag is an intermingled mass of low FeO-high $Ti_3O_5$ melt and relatively high FeO-relatively low $Ti_3O_5$ material.

The opposite extreme is a 13 coal-10 lime mix which under the conditions in question cannot be smelted with less coal. This amount of lime has a powerful fluxing effect and the charge rapidly melts in the furnace. The melting is believed to occur before iron reduction proceeds very far. The result is a melt high in FeO, high in CaO and low in titanium grade as well as essentially free from trivalent titanium. All four factors combine to produce a low melting, fluid slag. The rapid development of a very fluid slag results in floating of coal to the surface, under which conditions reduction of FeO in the slag is slow. The need for high coal in a high lime mix is that of resorting to excess coal to accomplish as much reduction (FeO to Fe) as possible and to take advantage of the mechanical effect of high coal in preventing premature slag bath formation. At the best, good iron reduction is not accomplished inasmuch as slag tap is necessary when iron in the slag is about 10 per cent. The time of tap is critical since over-running by as much as 0.05 kilowatt-hour per pound ore results in a slag tap in excess of 100 percent at the expense of the protective skull on the side walls, and may result in exposure of the refractory walls to the corrosive action of the very fluid slag. Slag of this type is tapped at 1450–1500° C., at which temperature reduction of titanium dioxide does not occur, particularly inasmuch as the high slag fluidity assures an equilibrium presumably unfavorable to the co-existence of FeO and $Ti_3O_5$.

The pronounced effect of small changes in lime is shown by the orderly sequence of slag values in progression from 10 CaO to 0 CaO.

The foregoing detailed discussion of the relationship between charge composition, smelting behavior, and slag quality has been entered into in order to show the great importance of charge composition. Fortunately, the smelting process is not subject to such serious limitations as the data appear to impose. The results are believed to apply to a straight batch smelting process and are probably qualitatively true for any process. However, the low rate of power input into the 100-kilowatt furnace heats up the charge relatively slowly and there is every opportunity for iron reduction before fusion. Melting of the charge becomes increasingly difficult as FeO becomes unavailable as a flux. At a higher power input rate, the rate of temperature increase is more rapid and less time is available for iron reduction. The charge therefore melts more readily by reason of the higher FeO content at a given temperature. With the initial production of a relatively high FeO slag, there is better opportunity for a homogeneous slag because of the greater fluidity. Over-reduction of $TiO_2$ is less likely and the slag may be tapped at a higher iron content with lower trivalent titanium content.

Additional smelting data was obtained from operations conducted in a rectangular furnace operated with three-phase power with the three electrodes in line. Provision was made for charging along the side walls of the furnace by introducing the charge mix through the roof or through doors in the end walls. The furnace was operated with batch charging. The results of two series of runs I and II are given in the following table. The weight gain as reported is uncorrected for oxidation of iron, and in order to obtain the weight gain attributable to the oxidation of trivalent titanium to titanium dioxide, one-seventh of the per cent of iron (as Fe) in the slag should be subtracted from the weight gain as reported. The "trivalent Ti" is the percentage of solubilized titanium present in the leach solution in the form of trivalent titanium.

The charge mix was introduced at 10 to 30 minute intervals. In the first run A, the charge was introduced through the roof onto the banks along the side walls. In the other runs, the charge was thrown through the end doors upon the side-wall banks. In both cases fresh charge rolled into the molten slag bath causing these differences as compared with batch smelting:

1. Cold charge on the bath holds down the slag temperature in the electrode zone with the result that reduction of iron and titanium does not become excessive.
2. Some unreduced ore almost immediately enters the slag, thereby maintaining FeO as a flux in the slag.
3. Coal has a tendency to segregate and float with the result that danger of over-reduction is avoided.
4. FeO and $TiO_2$ being intermittently (or continuously) added to the bath and slag fluidity being thereby maintained, equilibrium conditions are unfavorable for high reduction of titanium.

The results of these runs are given in the following table:

| Run | Charge, parts per 100 parts of ore | | Slag, Per Cent | | | Leach Recovery | Trivalent Ti | Acid to Ti Ratio |
|---|---|---|---|---|---|---|---|---|
| | Coal | Lime | $TiO_2$ | Fe | Weight Gain [1] | | | |
| | | | | | | Per cent | Per cent | |
| A | 13 | 2½ | 68-72 | 6-8 | 2.7 | 89.0 | 15 | 2.22 |
| B | 14 | 0 | 73.9 | 7.7 | 3.3 | 88.5 | 19 | 2.18 |
| C | 14 | 0 | 70.3 | 10.9 | 3.1 | 87.5 | 13 | 2.29 |
| D | 14 | 0 | 70.4 | 10.0 | 3.0 | 89 | 15 | 2.20 |
| E | 14 | 0 | 71.7 | 8.1 | 3.1 | 89 | 16 | 2.19 |
| F | 14 | 0 | 69.5 | 9.6 | 3.1 | 90.5 | 13 | 2.20 |

[1] Uncorrected for FeO to $Fe_2O_3$.

The following series of runs were carried out in a three phase electric arc furnace with closely spaced, triangularly disposed electrodes. The furnace was continuously operated with intermittent charging on the slag bath at 10 to 30 minute intervals.

| Run | Charge, parts per 100 parts of ore | | Slag, per cent | | | Leach Recovery | Acid to Ti Ratio |
|---|---|---|---|---|---|---|---|
| | Coal | Lime | $TiO_2$ | Fe | Weight Gain [1] | | |
| G | 13 | 1 | 67.5 | 10 | 3.8 | 91 | 2.15 |
| H | 13 | 0.5 | 70.5 | 7 | 2.7 | 91.5 | 2.00 |
| I | 13 | 0 | 73 | 5 | 3.1 | 89 | 2.1 |
| J | 13 | 1 | 75 | 5 | 3.5 | 89.5 | 2.05 |
| K | 13 | 1 | 75 | 5 | 3.2 | 90 | 2.1 |
| L | 13 | 1 | 70 | 8 | 2.8 | 88 | 2.2 |

[1] Uncorrected for FeO to $Fe_2O_3$.

The trivalent titanium in the leach solution was "intermediate" in the case of each slag, that is about 15%.

While the presence of iron in the slag does not appear to have any virtue in itself, it is an index

| Run | Power Kilowatts | Charge, Parts per 100 Parts of ore | | Slag, Per Cent | | | Leach Recovery | Trivalent Ti | Acid to Ti Ratio |
|---|---|---|---|---|---|---|---|---|---|
| | | Coal | Lime | $TiO_2$ | Fe | Weight Gain | | | |
| | | | | | | | Per Cent | Per Cent | |
| I | 300 | 12 | 2½ | 68-70 | 6-10 | 2.5 | 90-92 | 10 | 2.15 |
| II | 300 | 14 | 2 | 70 | 5-6 | 2.7 | 90-92 | 10 | 2.1 |

In another series of runs, the rectangular three-phase arc furnace was intermittently charged.

of the trivalent titanium in the slag. Low iron slags, containing less than about 2% iron, are too highly reduced and contain too high a content of the lower oxides of titanium to be suitable for chemical processing to produce pigment titanium dioxide. Slags containing more than 15% iron generally contain little or no trivalent titanium.

Another advantage resulting from the control of the reduction of titanium is that the metallic iron product (pig iron) produced is low in titanium. Sulfur enters the iron, and since no soda and relatively little lime are used, the phosphorus enters the iron rather than the slag.

The advantages of phosphorus-free titaniferous material for the production of pigment titanium dioxide of the rutile type are discussed in the copending application for United States Letters Patent of Lewis C. Copeland and Clayton W. Farber, Ser. No. 683,150, filed July 12, 1946. In the slag concentrate of the invention, it is possible to hold the phosphorus content of the slag below the critical limit, that is with the ratio of $P_2O_5$ to $TiO_2$ in the leach solution below 0.00025 (i. e. less than 0.025% $P_2O_5$ on the basis of the $TiO_2$). Indian ilmenite ore contains more phosphorus than the other titaniferous ores commonly used for pigment manufacture. A typical Indian ilmenite ore analyzed 0.17% $P_2O_5$ and 60% $TiO_2$, giving a $P_2O_5$ to $TiO_2$ ratio of 0.0028, which is approximately ten times the critical limit. Tabulated below are the analyses of titanium slag concentrates in accordance with the invention obtained by smelting this high phosphorus ore:

| Slag | Per Cent $TiO_2$ | Per Cent Fe | Per Cent $P_2O_5$ | Ratio $P_2O_5/TiO_2$ |
|---|---|---|---|---|
| A | 70.4 | 3.8 | 0.003 | 0.000043 |
| B | 70.2 | 4.7 | 0.004 | 0.000057 |
| C | 66.6 | 6.1 | 0.002 | 0.00003 |
| D | 61.7 | 7.1 | 0.02 | 0.0003 |
| E | 59.7 | 9.0 | 0.007 | 0.00012 |

With the exception of slag D, which is just on the edge, all the slags are sufficiently low in $P_2O_5$ so that titanium sulfate solutions made from them will have $P_2O_5$ to $TiO_2$ ratios falling well below the maximum value permitted for ready rutile formation. Titaniferous ores such as Allard Lake, Coulombe, Norwegian and Sanford Lake concentrates contain, by analysis, from 0.01 to 0.03 percent $P_2O_5$. With such low $P_2O_5$ contents, no difficulty is experienced in preparing slags from these ores sufficiently low in phosphorus even with iron contents considerably higher than the maximum of the preferred range.

Recapitulating the foregoing discussion, it will be seen that the titanium slag concentrate of the invention, in addition to its high grade and good digestibility, contains from 5 to 20% of lime and iron, calculated respectively as CaO and Fe, of which at least 2% is iron. Thus, the slag may contain from 2 up to 20% iron and from 18% down to an insignificant amount (say around 0.1%) lime. In its preferred form, the slag contains at least 70% titanium calculated as $TiO_2$, from 4 to 15% iron calculated as Fe, and up to 14% lime calculated as CaO. Slags of the invention prepared from ores with extremely low or negligible calcium content (0.05% or less CaO), such for example as Petit Pas or ilmenite, without any addition of lime to the smelting charge, will contain only an insignificant amount of lime, e. g. 0.1% or less. Since lime is for all practical purposes the only flux deliberately added to the smelting charge, the slag contains no sodium oxide or only such insignificant amount as may be present in the ore. Additionally, the slag is not highly reduced.

The presence of trivalent titanium tends to increase the viscosity of the slag. In the smelting operation, formation of trivalent titanium is held to a minimum by adjusting the quantity of coal included in the charge so that enough unreduced ferrous oxide is available to form, with the other slag-forming constituents present, a slag of proper fluidity at a temperature of 1500–1700° C. Excessive reduction of titanium will be thus largely avoided when from 4 to 10% of iron is left in the slag. The equilibrium between trivalent titanium and ferrous oxide left in the slag is affected by the amount of lime in the slag either from the gangue materials or added extraneously as a flux. For example, with 3 or more per cent (based on the ore) of lime added to a typical ore, a slag can be produced several per cent lower in iron without excessive reduced titanium.

Proper spacing of the electrodes so as to avoid localization of heat is also helpful in holding the trivalent titanium in the slag to a relatively low value. When operating so as to avoid the formation of trivalent titanium, slags of excessive fluidity may be produced which tend to corrode the lining. Such corrosion may be minimized by so operating the furnace that the new charge is retained at a temperature below the melting point but above the reduction temperature for iron oxide for a sufficient time to reduce a substantial part of the iron to metallic sponge iron before the charge melts and enters the bath. While a magnesite refractory is more resistant than other common refractories, it is rapidly attacked by the molten slag. This refractory difficulty may be largely overcome by using a magnesite lining in a steel shell and starting the furnace operation with a charge containing such an excess of coal as to produce a viscous slag which freezes on the magnesite lining to form a crucible. Thereafter by proper attention to the rate of power input, the rate of charging, the depth of bath, and the cooling of the shell, this frozen slag crucible can be maintained indefinitely.

Operating with certain ores relatively low in gangue and with no addition of flux, slags containing from 75 to 80% $TiO_2$ can be produced along with marketable pig iron. The tapping temperature of such slags is higher than that of lower grade slags fluxed with ferrous oxide and, more particularly, than that of slags fluxed with lime. Where it is desirable to produce a slag of lower $TiO_2$ grade, either as a direct objective or for the purpose of reducing the operating temperature of the furnace, lime may be added as a flux. Lime fluxing may be increased until slags are reduced to about 65% $TiO_2$ grade without any particular difficulty. Below this $TiO_2$ content, precautions demanded by increasing fluidity of the slag must be observed. Below 60% $TiO_2$ grade, lime-fluxed slags are very fluid and corrosive.

Fundamentally, the slag concentrate of the invention is obtained by an economically satisfactory concentration of titanium-iron ores by partial removal of iron therefrom. While this concentration is preferably carried out in an electric furnace, as hereinbefore described, the concentration has been effected with the production of slags of the invention in a reverberatory furnace.

We claim:
1. A titanium slag concentrate the constitu- ents of which are confined, with the exception of the possible addition of extraneous lime, to those normally present in ores of titanium and iron and in the coal used to smelt said ores to produce a metallic iron product and the titanium slag concentrate capable of being separated from one another while in the molten state at a temperature of 1500° to 1700° C., said slag concentrate containing as the essential components from 2 to 20% iron oxide calculated as Fe, up to 18% lime calculated as CaO, the total amount of said iron and lime ranging between 5 and 20%, and the balance titanium oxide, the minimum titanium oxide content being 60% calculated as $TiO_2$, said slag concentrate being further characterized in that upon sulfuric acid digestion and leaching at least 85% of the titanium is recoverable in the leach solution with an acid-to-titanium ratio in the solution of between 1.8 and 2.3.

2. A titanium slag concentrate the constituents of which are confined, with the exception of the possible addition of extraneous lime, to those normally present in ores of titanium and iron and in the coal used to smelt said ores to produce a metallic iron product and the titanium slag concentrate capable of being separated from one another while in the molten state at a temperature of 1500° to 1700° C., said slag concentrate containing as the essential components from 4 to 15% iron oxide calculated as Fe, up to 14% lime calculated as CaO, the total amount of said iron and lime ranging between 5 and 20%, and the balance titanium oxide, the minimum titanium oxide content being 70% calculated as $TiO_2$, said slag concentrate being further characterized in that upon sulfuric acid digestion and leaching at least 85% of the titanium is recoverable in the leach solution with an acid-to-titanium ratio in the solution of between 1.8 and 2.3.

3. A titanium slag concentrate the constituents of which are confined, with the exception of the possible addition of extraneous lime, to those normally present in ores of titanium and iron and in the coal used to smelt said ores to produce a metallic iron product and the titanium slag concentrate capable of being separated from one another while in the molten state at a temperature of 1500° to 1700° C., said slag concentrate containing as the essential components from 2 to 20% iron oxide calculated as Fe, up to 18% lime calculated as CaO, the total amount of said iron and lime ranging between 5 and 20%, and the balance titanium oxide, the minimum titanium oxide content being 60% calculated as $TiO_2$ with part of the titanium present in the form of trivalent titanium but not exceeding an amount corresponding to a weight gain of 3.5% attributable to oxidation of trivalent titanium to titanium dioxide as a result of an oxidizing heat treatment.

4. A titanium slag concentrate the constituents of which are confined, with the exception of the possible addition of extraneous lime, to those normally present in ores of titanium and iron and in the coal used to smelt said ores to produce a metallic iron product and the titanium slag concentrate capable of being separated from one another while in the molten state at a temperature of 1500° to 1700° C., said slag concentrate containing as the essential components from 4 to 15% iron oxide calculated as Fe, up to 14% lime calculated as CaO, the total amount of said iron and lime ranging between 5 and 20%, and the balance titanium oxide, the minimum titanium oxide content being 70% calculated as $TiO_2$ with part of the titanium present in the form of trivalent titanium but not exceeding an amount corresponding to a weight gain of 3.5% attributable to oxidation of trivalent titanium to titanium dioxide as a result of an oxidizing heat treatment.

WILLIS M. PEIRCE.
ROBERT K. WARING.
LUTHER D. FETTEROLF.

REFERENCES CITED

The following references are of record in the file of this patent:

UNITED STATES PATENTS

| Number | Name | Date |
| --- | --- | --- |
| 625,656 | Elbers | May 23, 1899 |
| 921,686 | Fitzgerald et al. | May 18, 1909 |
| 930,344 | Borchers | Aug. 10, 1909 |
| 1,334,004 | Van der Toorn | Mar. 16, 1920 |
| 1,743,885 | Gardner et al. | Jan. 14, 1930 |
| 1,745,360 | Desilva et al. | Feb. 4, 1930 |
| 1,831,852 | Farup | Nov. 17, 1931 |
| 2,375,268 | Wyckoff | May 8, 1945 |
| 2,445,377 | Wyckoff | July 20, 1948 |
| 2,471,242 | Royster | May 24, 1949 |

FOREIGN PATENTS

| Number | Country | Date |
| --- | --- | --- |
| 3,582 | Great Britain | 1901 |

OTHER REFERENCES

Smelting of Titaniferous Ores in the Blast Furnace, by A. Rossi, published in Iron Age, vol. 57 (1896), pages 354–6, 464–9.